March 5, 1929.   E. H. HENLEY   1,703,999
METHOD OF PREPARING BITUMINOUS CEMENT AGGREGATE COMPOUND
Filed Jan. 28, 1928

Inventor,
Eugene H. Henley

Patented Mar. 5, 1929.

1,703,999

UNITED STATES PATENT OFFICE.

EUGENE H. HENLEY, OF CHICAGO, ILLINOIS.

METHOD OF PREPARING BITUMINOUS-CEMENT-AGGREGATE COMPOUND.

Application filed January 28, 1928. Serial No. 250,323.

This invention consists of a novel step in a well-known method of producing bituminous cement aggregate composition which is fully described and claimed in Letters Patent of the United States No. 1,462,904, dated January 24, 1923, issued to S. E. Finley, and has for its main object to materially reduce the cost of carrying out said method and at the same time eliminate an appreciable part of the equipment required therefor to thereby reduce the total investment of the user of the method and thereby save also the loss by wear and tear consequent upon using the portion of the equipment which is eliminated by the present improvement.

Figure 1:
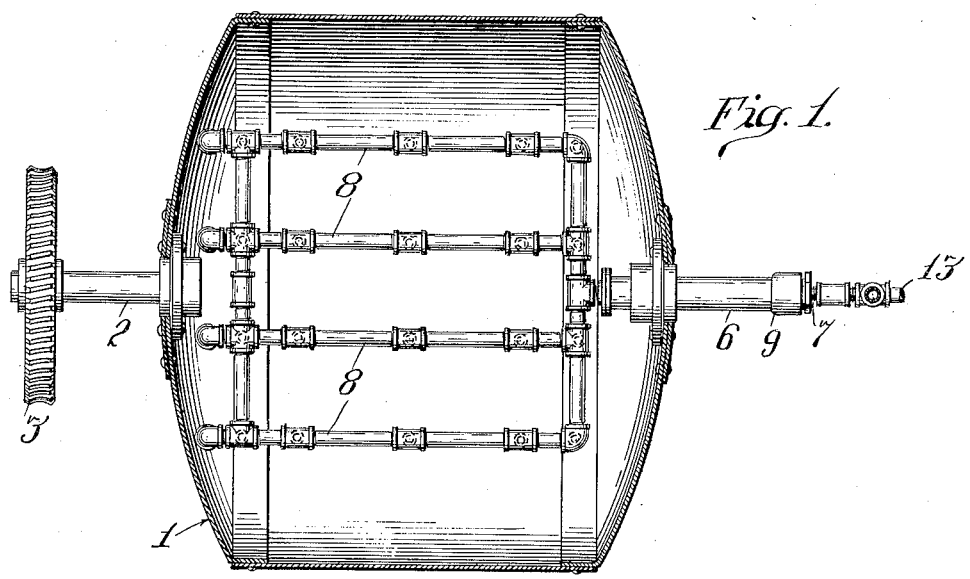
Figure 2:
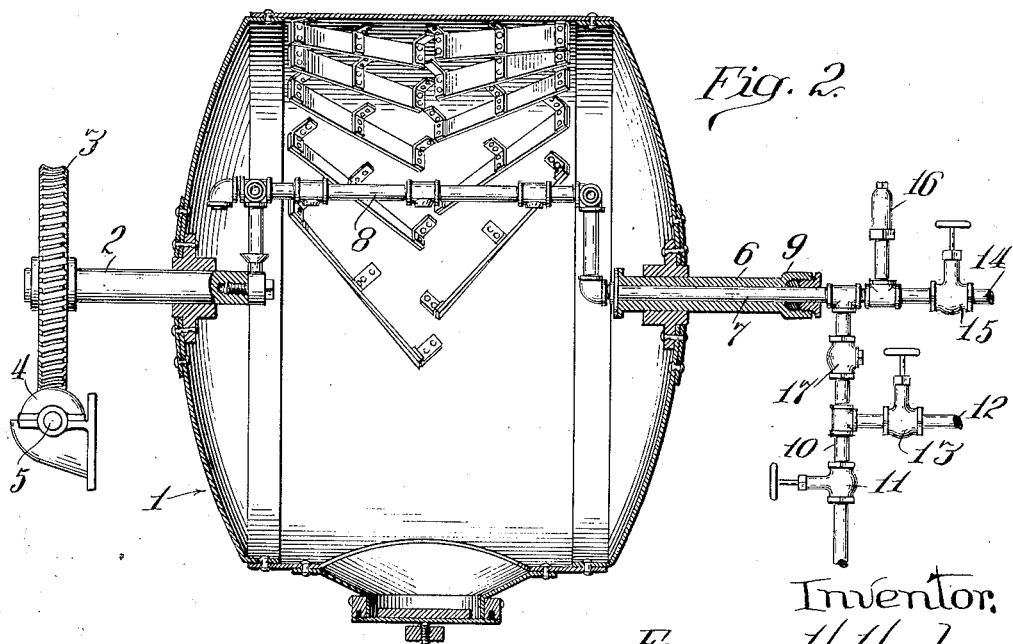

In carrying out the method as modified by the present improvement, I employ the same type and style of mixing drum as is at present used in carrying out the method described in the said Letters Patent, said drum being equipped with the additional piping and valves hereinafter described and shown in the accompanying drawings, wherein:

Fig. 1 is an inverted plan section and Fig. 2 is a central vertical section of a mixing drum adapted for carrying out the present method.

The method as defined in the above-mentioned Letters Patent consists briefly of the following steps, viz:

1. Heating the aggregate consisting of stone, pebbles, gravel, sand, clay, etc. to a relatively high temperature which, in carrying out the present method is preferably not less than 350 nor more than 500 degrees Fahrenheit.

2. Introducing the hot aggregate into a suitable mixing drum and therein agitating and tumbling the same to uniformly distribute the coarser and finer components.

3. While the aggregate is still very hot and preferably at a temperature, (according to the present method) not less than 300 degrees Fahr., introducing into the drum jets or sprays of suitable bituminous material at a temperature ranging from about 350 to 500 degrees Fahr. in an amount or a volume which is so proportioned to the volume of the aggregate as to produce the desired cement aggregate, the bitumen being introduced while the aggregate is being continuously tumbled.

4. When the supply of bitumen has been shut off and before the mass in the drum has cooled to an appreciable extent and while said mass is still being tumbled by rotation of the drum, introducing into the latter through the nozzles through which the bitumen is introduced, steam or, if a supply of the latter is not available, water in such volume as may be required to generate a steam presssure such as is best adapted to effectively carry out that step of the method which is effected by the air under pressure described in the said Letters Patent, it being obvious that water so introduced will be instantly converted into dry or superheated steam and that steam at low pressure will be similarly superheated. As the volume of water or wet steam required to generate the pressure necessary is inconsequential in proportion to the volume of hot aggregate, the conversion thereof into superheated steam will be accomplished without appreciably cooling the aggregate. The proportion of water to aggregate will be about one gallon of the former to one to three tons of the latter.

It will be very obvious that before the water or steam is introduced, the mineral aggregate will have been completely coated with bitumen so that the water or steam will contact only with the latter and, due to its instant conversion, will not mix therewith or serve to rehydrate any of the first mentioned dehydrated aggregate.

The substitution of steam or water for compressed air obviates the inclusion in a mixing plant of an air compressor and an operating engine therefor and eliminates the expense of operating the latter which, in most instances, amounts to about two hundred dollars ($200.00) per month.

A further advantage of the substitution of water or steam for compressed air resides in the rapidity with which the desired drum pressure is attained, as, unless a storage tank for compressed air is provided, a relatively long period of time is required for the compressor to build up drum pressure of the desired degree.

As a suitable heating plant is required to preheat the materials for the drum, it is obvious that at very small expense a suitable small steam boiler may be associated with said heating plant for low pressure steam generation by the waste products of combustion from the said plant without additional expense for fuel. A pressure of about 50 lbs. per square inch in the drum has been found ample for the proper functioning of said pressure so that if steam at such pressure is introduced into the drum, very little indeed of the heat of the aggregate will be absorbed in the super-heating of said steam.

After the aggregate has been subjected to the steam pressure for the requisite period, it may be used in part to preheat the surface upon which the aggregate is to be deposited, such surface, if of a bituminous nature will be softened or melted for better welding with the bitumen of the hot aggregate delivered from the drum.

Referring now to the drawings it will be noted that the drum 1 is equipped with a trunnion 2 rigid with the worm wheel 3 meshing with the worm 4 of a shaft 5 for rotating said drum. The other trunnion 6 of the drum is hollow and through it passes the supply pipe 7 for fluids, said pipe connecting with one or more spray pipes 8 within the drum, the pipes 7 and 8 being held against rotation and a stuffing box 9 being provided on the trunnion 6 to prevent escape of fluids. Associated with the pipe 7 is a pipe 10 controlled by a valve 11 for introducing liquid bitumen. A branch pipe 12 controlled by valve 13 connects with pipe 10 at a point between valve 11 and pipe 7 for introducing steam or water, it being obvious that when valve 13 is open, valve 11 must be closed and vice versa.

A blowoff pipe 14 controlled by valve 15 is also connected with the pipe 7 and a safety valve 16 is preferably disposed between the latter and the valve 15 for preventing generation of excessive pressure within the drum as by too rapid introduction of a larger volume of water than is necessary. A check-valve 17 may be interposed in pipe 10 between pipe 7 and pipe 12 for the purpose of permitting rapid introduction of water at low pressure and preventing backflow of steam while valve 13 is open in event of steam pressure exceeding the water pressure before the required volume of water has been introduced or before closure of valve 13 after introduction of the required volume of water. Obviously in instances where the service pressure is less than the desired drum pressure, a small hand pump may be used to force water into the drum.

The specific arrangement of valves and piping illustrated is purely diagrammatic as said piping and valves may obviously be otherwise relatively arranged to best function.

I claim as my invention:

1. A step in the method of producing bituminous cement aggregate which consists in preheating and then mixing the dry aggregate in a sealed receptacle and thereafter admixing therewith molten bituminous material, which consists in introducing into said receptacle while the aggregate and bitumen are still at high temperature, a sufficient quantity of $H_2O$ at a temperature lower than that of said aggregate to produce within the receptacle under the influence of the temperature of the contents thereof, steam pressure of any given degree.

2. A step in the method of producing bituminous cement aggregate which consists in preheating and then mixing the dry aggregate in a sealed receptacle and thereafter admixing therewith molten bituminous material, which consists in introducing into said receptacle while the aggregate and bitumen are still at high temperature, a sufficient quantity of water for conversion into steam by the heat of the contents of the receptacle to produce within the latter a fluid pressure of any desired degree.

3. In the method of producing bituminous cement aggregate which consists in preheating and then mixing the dry aggregate in a sealed receptacle and thereafter admixing therewith molten bituminous material, the step which consists in introducing into said receptacle while the contents thereof are still sufficiently hot to generate steam at a pressure exceeding fifty pounds per square inch, a sufficient volume of $H_2O$ in liquid or vapor form to generate within said receptacle under the influence of the heat of the contents thereof, a fluid pressure of approximately fifty pounds per square inch.

EUGENE H. HENLEY.